(12) United States Patent
Takeuchi et al.

(10) Patent No.: US 11,982,049 B2
(45) Date of Patent: May 14, 2024

(54) POLYESTER BASE FABRIC FOR AIRBAGS

(71) Applicant: TOYOBO CO., LTD., Osaka (JP)

(72) Inventors: Shuhei Takeuchi, Shiga (JP); Masahiro Sakai, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/786,664

(22) PCT Filed: Dec. 25, 2020

(86) PCT No.: PCT/JP2020/048763
§ 371 (c)(1),
(2) Date: Jun. 17, 2022

(87) PCT Pub. No.: WO2021/132575
PCT Pub. Date: Jul. 1, 2021

(65) Prior Publication Data
US 2022/0372697 A1   Nov. 24, 2022

(30) Foreign Application Priority Data

Dec. 25, 2019   (JP) ................................ 2019-234251

(51) Int. Cl.
| | | |
|---|---|---|
| D06N 3/00 | (2006.01) | |
| B60R 21/235 | (2006.01) | |
| D03D 1/02 | (2006.01) | |
| D03D 15/283 | (2021.01) | |
| D06M 15/643 | (2006.01) | |
| D06M 101/32 | (2006.01) | |
| D06N 3/12 | (2006.01) | |

(52) U.S. Cl.
CPC ......... *D06N 3/0036* (2013.01); *B60R 21/235* (2013.01); *D03D 1/02* (2013.01); *D03D 15/283* (2021.01); *D06M 15/643* (2013.01); *D06N 3/0006* (2013.01); *D06N 3/128* (2013.01); *B60R 2021/23514* (2013.01); *B60R 2021/23542* (2013.01); *D06M 2101/32* (2013.01); *D10B 2331/04* (2013.01); *D10B 2401/06* (2013.01); *D10B 2505/124* (2013.01)

(58) Field of Classification Search
None
See application file for complete search history.

(56) References Cited

U.S. PATENT DOCUMENTS

| | | |
|---|---|---|
| 2009/0215343 A1 | 8/2009 | Lopez et al. |
| 2011/0165806 A1 | 7/2011 | Kim et al. |
| 2012/0088419 A1 | 4/2012 | Lee et al. |
| 2013/0187367 A1 | 7/2013 | Kim et al. |
| 2015/0191142 A1 | 7/2015 | Youn et al. |
| 2018/0086300 A1 | 3/2018 | Yamada et al. |
| 2018/0208147 A1 | 7/2018 | Yokoi |
| 2020/0024798 A1 | 1/2020 | Akechi |

FOREIGN PATENT DOCUMENTS

| | | |
|---|---|---|
| CN | 102144057 | 8/2011 |
| CN | 103132333 | 3/2016 |
| EP | 3034686 | 6/2019 |
| JP | H08-134395 | 5/1996 |
| JP | H08-246289 | 9/1996 |
| JP | 2011-080158 | 4/2011 |
| JP | 2015-526600 | 9/2015 |
| KR | 20080083631 | 9/2008 |
| WO | 2016/158287 | 10/2016 |
| WO | 2017/010458 A1 | 1/2017 |
| WO | WO 2017/104529 | 6/2017 |

OTHER PUBLICATIONS

International Search Report for International Patent Application No. PCT/JP2020/048763 dated Mar. 16, 2021 (with English translation) (4 pages).
Indian Patent Office, IN Office Action in Indian Appln. No. 202217038859, dated Apr. 21, 2023, 6 pages, with English Translation.
Chinese Patent Office, CN Office Action in Chinese Appln. No. 202080090368.5, dated Feb. 8, 2023, 17 pages, with English Translation.

*Primary Examiner* — Arti Singh-Pandey
(74) *Attorney, Agent, or Firm* — Fish & Richardson P.C.

(57) ABSTRACT

The present disclosure describes a polyester fabric for airbags formed from a polyester fiber, which can reduce costs, and the polyester fabric for airbags has high restraint performance for receiving the occupant during deployment and maintains the performance at high levels even after aging, while maintaining the mechanical characteristics as a fabric for airbags. A polyester fabric for airbags has a resin provided on at least one surface wherein the polyester fabric has an optimized crimp ratio and has a scrubbing test count of 400 or more after aging treatment at 70° C. at 95% RH for 408 hours.

11 Claims, 1 Drawing Sheet

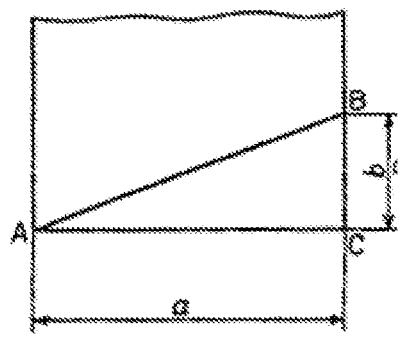

POLYESTER BASE FABRIC FOR AIRBAGS

CROSS-REFERENCE TO RELATED APPLICATIONS

This application is a National Stage application under 35 U.S.C. § 371 of International Application No. PCT/JP2020/048763, having an International Filing Date of Dec. 25, 2020, which claims priority to Japanese Application No. 2019-234251, filed on Dec. 25, 2019. The disclosures of the above-referenced prior applications are considered part of the disclosure of this application, and are incorporated in their entirety into this application.

TECHNICAL FIELD

The present invention relates to a polyester fabric for airbags. More specifically, the present invention relates to a polyester fabric for airbags that has high restraint performance for receiving the occupant during deployment, and that maintains the performance at high levels even after aging, while maintaining the mechanical characteristics as a fabric for airbags.

BACKGROUND ART

Airbags have been widely installed in automobiles as safety protection devices for occupants, and installed in a wide range of places, such as those for the driver seat and the front passenger seat, those for thigh protection built into passenger seats, and curtain airbags that are deployed along side windows. The volume of airbag fabrics used per vehicle is on the rise. The fabrics used in current airbags are mainly formed from polyamide fibers, which have properties suitable for the fabric for airbags, especially nylon 6,6 fibers. However, nylon 6,6 fibers are relatively expensive and increase costs as airbags are more widely used. Thus, there is demand for fabrics formed from polyester fibers, the original yarn cost of which is lower than that of nylon 6,6 fibers.

However, fabrics for airbags are required to have various characteristics to protect the occupants of an automobile. For example, fabrics for airbags must have not only deployment performance, but also various mechanical characteristics necessary for receiving an occupant, and must also maintain sufficient performance in an accelerated test for aging degradation in which the operation environment is assumed. To satisfy these requirements, for example, PTL 1 proposes a fabric for airbags intended to maintain its performance after aging degradation by defining the crumpling resistance after hydrothermal aging. However, such fabrics are formed from polyamide such as nylon 6,6, and polyester fabrics with such properties are not substantially disclosed.

Polyester fibers have properties not preferable in the use in fabrics for airbags as compared with nylon 6,6 fibers, and airbag fabrics formed from polyester fibers are not widely used at present.

CITATION LIST

Patent Literature

PTL 1: Chinese Patent Publication No. 103132333B

SUMMARY OF INVENTION

Technical Problem

The present invention was made in view of the problems of the art, and an object is to provide a polyester fabric for airbags that is formed from polyester fibers, which can reduce costs, that has high restraint performance for receiving the occupant during deployment, and that maintains the performance at high levels even after aging, while maintaining the mechanical characteristics as a fabric for airbags.

Solution to Problem

The present inventors conducted extensive research to achieve the object and completed the present invention. Specifically, the invention is as described below.

1. A polyester fabric for airbags, characterized in that the polyester fabric for airbags has scrub test strokes of 400 or more after aging treatment at 70° C. at 95% RH for 408 hours.

2. The polyester fabric for airbags according to Item 1, wherein an energy allowance (EA) per unit weight as calculated according to the following formula 1 is 5.0 (J/g) or less, $$EA(J/g)=(EW+EF)/W \quad \text{Formula 1:}$$

wherein EW (mJ/cm$^2$) represents a hysteresis energy per unit surface area in the warp direction when the fabric is stretched to a stress of 120 N/cm and then relaxed to a stress of 0 N/cm, EF (mJ/cm$^2$) represents a hysteresis energy per unit surface area in the weft direction when the fabric is stretched to a stress of 120 N/cm and then relaxed to a stress of 0 N/cm, and W (g/m$^2$) represents a weight per unit area of the fabric.

3. The polyester fabric for airbags according to Item 1 or 2, wherein a restraint capacity use rate (RR) calculated according to the following formula 2 is 85% or more, $$RR(\%)=RW/BW+RF/BF \quad \text{Formula 2:}$$

wherein RW (mm) represents an elongation of the fabric in the warp direction under a load of 120 N/cm, BW (mm) represents an elongation at breaking force of the fabric in the warp direction, RF (mm) represents an elongation of the fabric in the weft direction under a load of 120 N/cm, and BF (mm) represents an elongation at breaking force of the fabric in the weft direction.

4. The polyester fabric for airbags according to any one of Items 1 to 3, wherein the polyester fabric for airbags has an initial scrub test strokes of 500 or more.

5. The polyester fabric for airbags according to any one of Items 1 to 4, wherein the polyester fabric for airbags has a cover factor of 1900 to 2600.

6. The polyester fabric for airbags according to any one of Items 1 to 5, wherein the polyester fabric for airbags has a total weight of 300 g/m$^2$ or less.

7. The polyester fabric for airbags according to any one of Items 1 to 6, wherein the coating resin is a silicone resin, and the resin is coated in an amount of 5 g/m$^2$ or more and 50 g/m$^2$ or less.

8. The polyester fabric for airbags according to any one of Items 1 to 7, comprising a polyester fiber with a total fineness of 200 to 555 dtex, and a single-filament fineness of 6.0 dtex or less.

9. The polyester fabric for airbags according to any one of Items 1 to 8, wherein the polyester fabric for airbags has a dimensional change by dry-heat of 3% or less.

10. The polyester fabric for airbags according to any one of Items 1 to 9, wherein the polyester fabric for airbags has a bow rate of 3% or less.

11. The polyester fabric for airbags according to any one of Items 1 to 10, wherein the polyester fabric for airbags has a VOC component content of 100 ppm or less.

12. The polyester fabric for airbags according to any one of Items 1 to 11, wherein warp yarn and weft yarn that constitute the fabric each have a crimp ratio of 1.0% to 12.0%.

Advantageous Effects of Invention

The present invention can provide a fabric with a high level of various characteristics to protect the occupants in an automobile when used in airbags even though the fabric is formed from a relatively inexpensive polyester fiber.

BRIEF DESCRIPTION OF DRAWINGS

FIG. 1 describes the method for measuring the bow rate.

DESCRIPTION OF EMBODIMENTS

The technical concept of the present invention includes three main elements. Specifically, the scrub test strokes after aging treatment at 70° C. at 95% RH for 408 hours is 400 or more, the energy allowance (EA) per unit weight determined from the hysteresis energy of the fabric under a stress of 120 N/cm is 5.0 J/g or less, and the restraint capacity use rate (RR) determined from the percentage of the elongation at 120 N/cm relative to the elongation at breaking force is 85% or more.

The present inventors analyzed in detail polyester fabrics and polyamide (e.g., nylon 6,6) fabrics, and found that first, a polyester fabric having a scrub test strokes of 400 or more after aging treatment at 70° C. at 95% RH for 408 hours can provide a fabric for airbags comparable to a polyamide fabric. More preferably, the scrub test strokes after aging treatment at 70° C. at 95% RH for 408 hours is 450 or more. Although the upper limit of the scrub test strokes is not particularly limited, the upper limit of the scrub test strokes is preferably 2500 or less, and more preferably 2000 or less given the relationship between the fabric for airbags and the coating agent for use.

According to the analysis of the present inventors, typical polyester fabrics tended to have lower crumpling resistance than polyamide fabrics after hygrothermal aging. This is probably due to the fact that the bond between the silicone coating typically used in airbag coating and polyester is more susceptible to moisture than nylon 6,6.

The means for obtaining a polyester fabric having a scrub test strokes of 400 or more after aging treatment at 70° C. at 95% RH for 408 hours is not particularly limited, and may be, for example, modification of the surface of polyester fibers.

However, in order to effectively exploit the low cost feature of polyester fibers, it is recommended that the crimp ratio of polyester fibers forming the fabric be higher, as described below. The inventors found that the higher the crimp ratio, the more bumps and dips are present in the surface structure of the fabric, thus increasing the surface area at which the coating agent comes into contact with the polyester fabric, and thus even improving the crumpling resistance after hygrothermal aging. This eliminates the need for, for example, surface modification of polyester fibers, and provides polyester fabrics for airbags that can withstand hygrothermal aging at a low cost.

In the present invention, the scrub test strokes of the fabric after aging treatment at 70° C. at 95% RH for 408 hours is measured in accordance with ISO 5981. Specifically, a test specimen after undergoing aging treatment at 70° C. at 95% RH for 408 hours with a thermo-hygrostat is fixed onto a scrub tester and tested under an initial load of 1 kgf, followed by visually studying the degree of peeling of the coating on the sample after the test.

The polyester fabric for airbags according to the present invention preferably has an energy allowance (EA) per unit weight calculated according to the following formula 1 of 5.0 (J/g) or less.

$$EA(\text{J/g}) = (EW + EF)/W \qquad \text{Formula 1:}$$

wherein EW (mJ/cm$^2$) represents a hysteresis energy per unit surface area in the warp direction when the fabric is stretched to a stress of 120 N/cm and then relaxed to a stress of 0 N/cm, EF (mJ/cm$^2$) represents a hysteresis energy per unit surface area in the weft direction when the fabric is stretched to a stress of 120 N/cm and then relaxed to a stress of 0 N/cm, and W (g/m$^2$) represents a weight per unit area of the fabric.

The value "120 N/cm" corresponds to the maximum stress applied to an airbag fabric being deployed. Specifically, the energy allowance of an airbag when stretched to a stress of 120 N/cm and then relaxed to a stress of 0 N/cm indicates the degree of allowance of energy received by the airbag fabric from the inflator during airbag deployment behavior. The smaller the energy allowance, the better the deployment performance is; the energy allowance is also an important factor from the standpoint of preventing the airbag from bursting due to energy received by the fabric.

If the energy allowance (EA) per unit weight is 5.0 J/g or less, the resulting airbag can use the energy emitted from the inflator during deployment with no waste. Presumably, this allows for rapid deployment and even reduces the risk of bursting caused by the rupture of the fabric due to the small amount of energy tolerated by the fabric. More preferably, the energy allowance (EA) per unit weight is 4.0 J/g or less. The lower limit of the energy allowance (EA) per unit weight is not particularly limited; due to the characteristics of polyester fibers, the lower limit of the energy allowance (EA) per unit weight is preferably 0.1 J/g or more, and more preferably 0.5 J/g or more.

The polyester fabric for airbags according to the present invention preferably has a restraint capacity use rate (RR) of 85% or more calculated according to the following formula 2.

$$RR(\%) = RW/BW + RF/BF \qquad \text{Formula 2:}$$

wherein RW (mm) represents an elongation of the fabric under a load of 120 N/cm in the warp direction, BW (mm) represents an elongation at breaking force of the fabric in the warp direction, RF (mm) represents an elongation of the fabric under a load of 120 N/cm in the weft direction, and BF (mm) represents an elongation at breaking force of the fabric in the weft direction.

More preferably, the restraint capacity use rate (RR) is 90% or more. The upper limit of the restraint capacity use rate (RR) is not particularly limited; due to the characteristics of the fabric, the upper limit of the restraint capacity use rate (RR) is preferably 200% or less, and more preferably 150% or less.

The present inventors found that polyester fabrics are more likely to burst than polyamide fabrics. This is probably due to the following reasons: traditional polyester fabrics are more rigid than polyamide fabrics such as nylon 6,6, and the elongation curve of stress elongation of polyester fabrics reaches a high stress with a shorter elongation than nylon 6,6 (i.e., having a high level of rigidity); thus, polyester fabrics have lower elongation performance than nylon 6,6, and cannot tolerate the energy at the time of deployment, and thus easily burst.

The value of restraint capacity use rate (RR) defined as "the elongation at 120 N/cm relative to the elongation at breaking force" indicates the slope of a stress elongation curve in the deployment behavior of an airbag. Specifically, the present inventors found that because a higher restraint capacity use rate (RR) results in a greater elongation of the fabric during deployment, the risk of an airbag bursting during deployment due to rapid elongation of the fabric can be reduced.

The polyester fabric for airbags according to the present invention has an initial scrub test strokes of preferably 500 or more, and more preferably 550 or more from the standpoint of ensuring safety during deployment. The upper limit of the scrub test strokes is not particularly limited; given the relationship between the polyester fabric and the coating agent for use, the upper limit of the scrub test strokes is preferably 3000 or less, and more preferably 2500 or less.

In the present invention, the initial scrub test strokes of a fabric is measured in accordance with ISO 5981. Specifically, a test specimen is fixed onto a scrub tester and tested under an initial load of 1 kgf, followed by visually studying the degree of peeling of the coating on the sample after the test.

Given the restraint capacity use rate (RR) and the scrub test strokes, the polyester fabric for airbags according to the present invention preferably has a cover factor (CF) of 1900 to 2600. More preferably, the lower limit of the cover factor (CF) is 2200, and more preferably, the upper limit of the cover factor (CF) is 2500. CF was calculated according to the following formula.

$$CF=(\sqrt{A})\times(W1)+(\sqrt{B})\times(W2)$$

wherein A and B respectively denote the thickness of the warp yarn and the thickness of the weft yarn (dtex), and W1 and W2 respectively denote the longitudinal weaving density and the latitudinal weaving density (thread/2.54 cm).

The polyester fabric for airbags according to the present invention preferably has a total weight of 300 g/m² or less, and more preferably 233 g/m². A total within this range makes it easy to reduce the weight of the airbag fabric and further improves packageability of airbags into a module.

The lower limit of the total weight of the polyester fabric for airbags according to the present invention is not particularly limited as long as the fabric can achieve air permeability satisfactory in application in airbags; a polyester fabric with a total weight of 180 g/m² or more is considered to have air permeability so to be usable as an airbag.

In the present invention, the total weight is measured in accordance with JIS L 1096 8.3. From a sample, two test specimens of about 200 mm×200 mm are taken, and the absolute dry mass (g) of each specimen is measured to determine the mass per square meter (g/m²). The average is calculated and determined to be the total weight.

Preferably, the resin applied to the polyester fabric for airbags according to the present invention is silicone resin, and is applied in an amount of 5 g/m² or more and 50 g/m² or less. Silicone resin is relatively inexpensive and can achieve excellent low air permeability. A resin in an amount within the range can achieve flexibility and packageability while sufficiently limiting air permeability.

The polyester fabric for airbags according to the present invention is preferably formed from polyester fibers having a total fineness of 200 to 555 dtex. Although polyester fibers tend to have reduced packageability due to their rigidity greater than that of nylon 6,6 fibers, polyester fibers having a total fineness of 200 dtex or more do not have the need to overly increase the weaving density and thus limit excessive increase in the binding force of warp yarn and weft yarn, making it easy for packageability in an airbag module to fall within an appropriate range. Polyester fibers having a total fineness of 555 dtex or less also make it easy to limit excessive increase in rigidity of yarn constituting the woven fabric.

The polyester fabric for airbags according to the present invention is preferably formed from polyester fibers having a single-filament fineness of 6.0 dtex or less. Polyester fibers having a single-filament fineness of 6.0 dtex or less can achieve spinnability together with packageability of airbags.

The polyester fabric for airbags according to the present invention preferably has a dimensional change by dry-heat of 3% or less and more preferably 2.5% or less after dried at 150° C. for 30 minutes. A dimensional change by dry-heat within this range ensures sufficient elimination of residual shrinkage of yarn and can reduce the change in dimensions after the fabric is incorporated into an airbag module.

The polyester fabric for airbags according to the present invention preferably has a bow rate of 3% or less, and more preferably 2.5%. A bow rate within these ranges contributes to improvement in work efficiency in cutting and sewing processes because of the low bow of the woven fabric.

The airbag fabric according to the present invention preferably has a VOC content of 100 ppm or less. A VOC content of 100 ppm or less can comply with environmental regulations of various countries.

The polyester fabric for airbags according to the present invention preferably has a crimp ratio of the yarn constituting the fabric of 1.0% to 12.0% in both the warp yarn and weft yarn, more preferably 1.5% to 10.0%, and still more preferably 2.0% to 7.0% in both the warp yarn and weft yarn. The present inventors found that if the crimp ratio falls within these ranges, a polyester fabric with a scrub test strokes after aging treatment at 70° C. at 95% RH for 408 hours, an energy allowance (EA) per unit weight, and a restraint capacity use rate (RR) all falling within satisfactory ranges can be obtained at low cost. Specifically, if the crimp ratio falls within these ranges, the fabric has appropriate bumps and dips; not only does this improve the adhesiveness between the polyester fabric layer and the resin layer and allow for homogeneous coating of the resin, but also imparts appropriate stress-elongation characteristics and response to stress to the fabric, making it easier for the polyester fabric to have an energy allowance (EA) per unit weight and a restraint capacity use rate (RR) falling within satisfactory ranges.

It is presumed that at the time the fabric is stretched in the longitudinal direction or lateral direction during deployment of the airbag, a crimp ratio falling within these ranges allows stretched crimps to act as a cushion to disperse the force suddenly applied to the fabric, and this compensates for the shortcoming of the polyester fabric, which is thought to be more difficult to stretch than nylon fabrics.

The crimp ratio in the present invention was measured in accordance with the method described in JIS L1096 (2010) 8.7.2 method B. The load applied was 1/10 g per dtex.

Examples of polyester fibers for use in the polyester fabric for airbags according to the present invention include polyethylene terephthalate and polybutylene terephthalate; the polyester fibers may be fibers composed of a copolymerized polyester formed by copolymerizing polyethylene terephthalate or polybutylene terephthalate with an aliphatic dicarboxylic acid such as isophthalic acid, 5-sodium sulfoisophthalic acid, or adipic acid, as an acid component.

The polyester fabric for airbags according to the present invention preferably has a weaving density of 40 threads/2.54 cm or more, and more preferably 46 threads/2.54 cm or more in both the warp direction and weft direction. A weaving density of 46 threads/2.54 cm or more can limit the loss of the fabric structure during the weaving process. Although the upper limit of the weaving density is not particularly limited, the upper limit is preferably 70 threads/2.54 cm or less due to the restriction of weft insertion in weaving.

In the present invention, the weaving density is measured in accordance with JIS L1096 (2010) 8.6.1. Specifically, a sample is placed on a flat table, and unnatural creases and crimps, as well as tension, are removed. Then, the number of threads of the warp yarn and the weft yarn for every 2.54-cm section in five different parts is counted, and the average of each yarn is calculated per unit length and determined to be the weaving density.

The polyester fabric for airbags according to the present invention has a tensile strength of preferably 500 N/cm or more, and more preferably 550 N/cm or more from the standpoint of mechanical characteristics. Although the upper limit of tensile strength is not particularly limited, the upper limit is preferably 1000 N/cm or less, and more preferably 900 N/cm or less in relation to the total fineness and tensile strength of the polyester multifilament for use, and the weaving density of the airbag fabric.

In the present invention, the tensile strength of the fabric is measured in accordance with JIS L1096 (2010) 8.12.1. Specifically, a test specimen is gripped with a tensile tester under an initial load, and a test is performed with the width of the test specimen being 50 mm and the distance between the grips of 200 mm at a tension rate of 200 m/min, followed by measuring the strength (N) when the specimen is cut. However, a specimen cut within 10 mm from the grips and a specimen that has broken abnormally are excluded.

The aspect ratio of the cross-sectional shape of single filaments of the polyester fibers that constitute the polyester fabric for airbags according to the present invention is preferably 1.4 or less. The cross-sectional shape of single filaments of the constituent threads of the airbag fabric may change to a shape different from that of the single filaments of the original yarn, such as due to the tension during processing. An aspect ratio of the cross-sectional shape of single filaments of the constituent threads of the airbag fabric within the range of 1.4 or less allows the cross-sectional surface of the yarn to be aligned neatly in a predetermined direction when the airbag is folded, making it easier to achieve desired low air permeability.

The polyester fibers of original yarn for use in the production of the polyester fabric for airbags according to the present invention have a dimensional change by dry-heat of preferably 3% or more, and more preferably 4% or more from the standpoint of reducing air permeability and adding an appropriate crimp ratio. However, an overly high dimensional change by dry-heat may increase the thickness of the airbag fabric after shrink processing or may result in failure to form a uniform resin layer, with large bumps and dips on the surface. From the standpoint of the packageability of the airbag in a module, polyester fibers as original yarn have a dimensional change by dry-heat of preferably 12% or less, and more preferably 10% or less. Due to a dimensional change by dry-heat within these ranges, a shrinkage treatment, described later, can provide a coated fabric for airbags with a low air permeability, an appropriate crimp ratio, and excellent packageability in a module.

In the present invention, the dimensional change by dry-heat of original yarn is measured in accordance with JIS L1013 (2010) 8.18.2 dry-heat dimensional change rate, method B. Specifically, the dimensional change by dry-heat is measured in the following manner. A sample is subjected to an initial load, and then two points 500 mm apart are marked. After the initial load is removed, the sample is hung in a dryer at 180° C. and allowed to stand for 30 minutes. Thereafter, the sample is taken out and cooled to room temperature, and then subjected to an initial load again. The length between the two points is measured, and the dry-heat dimensional change rate (%) is calculated according to the following formula. The average of three measurements is determined to be the dimensional change by dry-heat.

$$\Delta L = L - 500/500 \times 100$$

ΔL: Dimensional Change by Dry-heat shrinkage (%), L: Length between 2 points (mm)

The following describes methods suitable for obtaining the polyester fabric for airbags according to the present invention in detail; however, the polyester fabric for airbags according to the present invention is not limited to the fabric produced by these methods.

The warp yarn tension in weaving the polyester fabric for airbags according to the present invention is preferably 120 to 200 cN/thread. A warp yarn tension of 120 cN/thread or more allows the crimp ratio to fall within an appropriate range, in addition to making it unlikely for slack to occur in warp yarn during weaving, for defects to form in the fabric, or for a loom to stop. A warp yarn tension of 200 cN/thread or less makes it easier to prevent an excessive tension to be applied to warp yarn, thus reducing defects in the fabric.

Because of the difficulty in increasing the crimp ratio of polyester fibers compared with nylon 6,6 fibers, it is preferable to set the dwell angle of the reed to 60 to 120° to increase the crimp ratio while reducing the fabric defects when weaving the polyester fabric for airbags according to the present invention. A dwell angle of the reed falling outside of this angle range may result in failure to secure a traveling area of the weft yarn and thus may cause many fabric defects.

Additionally, it is preferable to attach a guide roll between the back roller and the peddle to lift the warp yarn 20 to 50 mm from the warp line in order to increase the crimp ratio in the longitudinal direction and to reduce fabric defects. If the warp line falls outside of this position range, the difference in tension between the upper yarn and the lower yarn may result in many fabric defects.

It is also preferable to attach a positive easing mechanism to the back roller to maintain fabric strength while improving the crimp ratio in the longitudinal direction. The amount of easing in the positive easing mechanism is preferably 5 to 7.5 mm, and the timing of easing is preferably cross timing of the loom ±30°. Using the positive easing mechanism within this setting range prevents excessive tension from being applied to the warp yarn during the shedding motion, prevents excessive tension from being applied to the yarn, and thus maintains fabric strength. Additionally, because shedding can be performed on the warp yarn with appropriate tension, the crimp ratio can be improved in the longitudinal direction. It is also preferable to adjust the pump diameter, stroke, and nozzle diameter in the direction so as to increase the conveying power of the yarn in order to improve the crimp ratio in the warp direction.

Because it is more difficult to increase the crimp ratio of polyester fibers than that of nylon 6,6 fibers, it is preferable to set the take-up tension to 250 to 1500 N in the winder in the weaving process. Because polyester fabrics are stiffer than nylon 6,6 fabrics, and the take-up tension can be set lower than that of nylon 6,6, the crimp ratio can be improved by setting the take-up tension low to the degree that creases or slack during take-up is prevented.

Shrinkage processing includes, for example, hydrothermal processing and heat-setting processing as typified by a pin tenter, and hydrothermal processing, which uses hot water in shrinkage processing, is particularly preferred. Hot water can be used by a method such as immersing the woven fabric obtained in the above weaving process in hot water or spraying the woven fabric with hot water. The temperature of hot water is preferably about 80 to 100° C., and more preferably 95° C. or higher. A hot-water temperature within these ranges is preferred because it allows the greige fabric to efficiently shrink after weaving and improves the crimp ratio of the fabric. The woven fabric obtained by weaving can be dried first and then subjected to a shrinkage process; however, it is advantageous in terms of production costs if the woven fabric obtained by weaving is subjected to a shrinkage process without being dried and then subjected to dry finishing.

The drying temperature of hot-air drying processing in the production step of the polyester fabric for airbags according to the present invention is preferably 100° C. to 150° C. at the fabric surface at the outlet of the dryer. A fabric surface temperature within this range allows the fabric to be sufficiently dried and even improves the crimp ratio of the fabric by hot air. It is also preferable to adjust the temperature of the hot air dryer so that the fabric surface temperature at the outlet of the dryer is within the range of 100° C. to 150° C. For this purpose, it is preferable to set the temperature of the hot air dryer to 130° C. to 180° C.

The coating resin for use in the coating step of the production step of the polyester fabric for airbags according to the present invention is preferably an elastomer resin that has heat resistance, cold resistance, and flame retardancy; silicone-based resin is most effective. Specific examples of silicone-based resin include addition-polymerization silicone rubber. Examples include dimethyl silicone rubber, methyl vinyl silicone rubber, methylphenyl silicone rubber, trimethyl silicone rubber, fluorosilicone rubber, methyl silicone resin, methylphenyl silicone resin, methyl vinyl silicone resin, epoxy-modified silicone resin, acrylic-modified silicone resin, and polyester-modified silicone resin. In particular, methyl vinyl silicone rubber is preferable because of its post-curing rubber elasticity, excellent strength and elongation, and cost effectiveness.

In the polyester fabric for airbags according to the present invention, the resin viscosity of silicone resin for use is very important. The viscosity of silicone resin is preferably 10 Pa·sec or more, and more preferably 15 Pa·sec or more. Although the upper limit is not particularly limited, a resin viscosity exceeding 40 Pa·sec results in the woven-mesh portion formed by the warp yarn and weft yarn on the non-coated surface having no resin essential to improve the tensile strength of the post-coating polyester fabric. Either a solvent-based resin or a solvent-free resin is usable as long as the viscosity can be adjusted so as to fall within the ranges. However, given the environmental impact, a solvent-free resin is preferable. In the present invention, if a resin composition containing additives other than resin is used, the viscosity of the resin composition is also defined as a "viscosity of resin."

It is also preferred that the resin have a film strength of 3 MPa or higher and a film elongation of 250% or higher. In general, the film strength and the film elongation are cooperative physical properties. However, a film elongation of 250% or higher allows the resin present in the woven-mesh portion of the warp yarn and the weft yarn to stretch and increases the conformability of the coated fabric in the scrub test, thereby achieving high crumpling resistance. The more preferred range for the film elongation is 300% or higher. The upper limit of the film strength is not particularly limited, but is preferably 10 MPa or lower. The samples for measuring the film strength and elongation of silicone resin are prepared under conditions (temperature, time, and pressure) for actual coating and film formation on the fabric for airbags. Specifically, a film of silicone resin with a constant thickness of 0.5 mm is prepared, cured at 190° C. for 2 minutes by exposing it to hot-air, and then subjected to a tensile test.

The hardness of the resin is measured in accordance with ASTM D2240, and the hardness measured using a Shore A durometer is preferably 40 or less, and more preferably 38 or less. A hardness of 40 or less improves conformability due to resin deformation during the scrub test in the same manner as with the elongation of the resin, thereby achieving high crumpling resistance as a fabric. The lower limit is not particularly limited, but is typically 25 or higher.

The polyester fabric for airbags according to the present invention has an average resin thickness in the warp and weft of preferably 4 μm or more, and more preferably 6 μm or more at the top portion of the coated fabric. "Top portion" refers to a portion of the warp yarn or the weft yarn at which the resin film is thinnest. In the present invention, it is preferred that the resin not penetrate too deep into the interior of the woven fabric, and be present throughout the entire coating surface of the woven fabric, in particular at the top portion of the woven fabric, with a relatively uniform film thickness. An average resin thickness of less than 4 μm may result in failure to limit ventilation and to satisfy flame retardancy. Although no upper limit is set, an average resin thickness of 25 μm or more may make it difficult to coat the fabric by knife coating.

The polyester fabric for airbags according to the present invention has an average resin thickness in the warp and weft of preferably 4 μm or more, and more preferably 6 μm or more at the top portion of the coated fabric. "Top portion" refers to a portion of the warp yarn or the weft yarn at which the resin film is thinnest. In the present invention, it is preferred that the resin not penetrate too deep into the interior of the woven fabric, and be present throughout the entire coating surface of the woven fabric, in particular at the top portion of the woven fabric, with a relatively uniform film thickness. An average resin thickness in the warp and weft of less than 4 μm may result in failure to limit ventilation and to satisfy flame retardancy. Although no upper limit is set, an average resin thickness of 25 μm or more may make it difficult to coat the fabric by knife coating.

In the present invention, the method for applying a resin can be a conventional known method. From the standpoint of the ease of adjusting the coating amount and the effect of mixed foreign matter (protruding objects), coating by knife coating, in particular knife-on-air, is most preferable. With the knife-on-bed method, it is easy for the resin to penetrate the woven fabric, but it is difficult to allow resin to be present at the top portion of the coated surface of the woven fabric; this makes it difficult to achieve the ventilation control fundamentally required in coated fabrics. In the present invention, the knife for use in knife coating may have a blade with a point shape such as semicircle or square.

In knife coating by knife-on-air, the fabric tension in the travel direction is preferably 500 to 2000 N/m, and particularly preferably 1000 to 1800 N/m. A fabric tension of less than 500 N/m in the travel direction may result in a base woven fabric with a bulky selvage portion, making it likely to cause a large difference in the coating amount between the center portion and end portions of the fabric. A fabric tension exceeding 2000 N/m in the travel direction may close the interstice between the warp yarn and the weft yarn, thus not allowing resin to be present in the woven-mesh portion formed by the warp yarn and the weft yarn on the uncoated surface, and may further cause the fabric to be stretched during the coating process, thereby decreasing the crimp ratio of the fabric.

In the present invention, it is important that the push-in depth of the knife is 1 to 6 mm. The push-in depth of the knife is equivalent to the amount by which the knife is pushed downward from the top surface of the bed in knife-on-air, in which the height at the top surface is determined to be 0 mm beforehand. The push-in depth of the knife is more preferably 1.5 to 4.5 mm. A push-in depth of less than 1 mm may not allow resin to be present in the woven-mesh portion formed by the warp yarn and the weft yarn on the uncoated surface, which is the purpose of this invention. A push-in depth of 6 mm or more makes it easy for the resin to penetrate the interior of the woven fabric, but makes it difficult for the resin to be present at the top portion of the coated surface of the woven fabric; this may result in failure to achieve the ventilation control fundamentally required in coated fabrics.

The method for drying and curing the applied coating agent can be a typical heating method such as hot air, infrared light, or microwave. Regarding the curing temperature and curing time of coating, the fabric surface temperature at the outlet of the heat treatment device is preferably 165° C. to 200° C. A fabric surface temperature within this range can sufficiently cure silicone resin and can even increase the crimp ratio of the fabric by heat. Regarding the temperature of the heat treatment device, because the fabric surface temperature at the outlet of the heat treatment device is preferably 165° C. to 200° C., the temperature of the heat treatment device is preferably set to 200° C. to 220° C.

The airbags formed from the polyester fabric for airbags according to the present invention are suitable for use in driver airbags, front-passenger airbags, curtain airbags, side airbags, knee airbags, seat airbags, and reinforcement fabrics, for example. Thus, these products are also included in the scope of the present invention. Airbags formed from the airbag fabric according to the present invention are preferably those in which a long component in the lateral direction is particularly required because post-sewing yarn misalignment is unlikely to occur at the time the coated fabric is cut in the lateral direction to obtain a long component. Specifically, side-curtain airbags are preferable. Additionally, because the coated fabric for airbags according to the present invention is excellent in packageability, airbags that are especially required to have packageability are also preferable. Specifically, driver airbags, front-passenger airbags, and curtain airbags are preferable. Airbags formed from the fabric for airbags according to the present invention are more preferably airbags required to be a long component in the lateral direction and to have packageability. Specifically, airbags for side curtains are more preferable.

EXAMPLES

The following describes the present invention in more detail with reference to Examples. However, the present invention is not limited by the following Examples, and can of course be implemented with appropriate changes to the extent that the changes conform to the purposes described above and below, all of which changes are included in the technical scope of the invention. The test methods for various performance conducted in the following Examples are as follows.

Total Weight of Fabric

Measurement was performed in accordance with JIS L1096 (2010) 8.3.2. Two test specimens (about 200 mm×200 mm) were taken from a sample, and the absolute dry mass (g) of each specimen was weighed to determine the mass per square meter (g/m$^2$). The average was calculated and determined to be the total weight.

Weaving Density of Fabric

Measurement was performed in accordance with JIS L1096 (2010) 8.6.1. A sample was placed on a flat table, and unnatural creases and tension were removed. The number of threads of the warp yarn and the weft yarn for every 2.54-cm section in five different parts was counted, and the average was calculated per unit length and determined to be the density.

Fabric Thickness

Measurement was performed in accordance with JIS L1096 (2010) 8.4. Specifically, after waiting 10 seconds for the thickness to settle, a sample was measured at five different parts with a thickness measurement machine under a pressure of 23.5 kPa, and the average was calculated.

Tensile Strength and Elongation at Breaking Force of Fabric

Measurement was performed in accordance with JIS K 6404-3:1999 6 test method B (strip method). A test specimen was gripped with a tensile tester under an initial load, and a test was performed with the width of the test specimen being 50 mm and the distance between the grips of 200 mm at a tension rate of 200 m/min, followed by measuring the strength (N) and the elongation (mm) when the specimen was cut. However, a specimen cut within 10 mm from the grips and a specimen that was broken abnormally were excluded.

Energy Allowance per Unit Weight

Regarding the energy allowance per unit weight, yarn was removed from both sides of the width in both the longitudinal direction and the lateral direction in accordance with JIS K 6404-3:1999 6. test method B (strip method), and three test specimens (width: 30 mm, length: 300 mm) were taken and stretched with a tester (a model for constant rate of traverse) with the distance between the grips being 150 mm at a tension rate of 200 ram/min until the stress reached 120 N/cm. Immediately after that, the specimens were relaxed at a tension rate of 200 ram/min until stress reached 0 N/cm. The area surrounded by a curve line from the start to the end of elongation was calculated based on the obtained data on stress and elongation and the following formula (3). This area corresponds to the energy amount that the fabric can tolerate during the process from the start to the end of elongation. The average in the warp direction and average in the weft direction of the fabric were calculated based on the results of integration of the calculated areas, and the average was divided by the surface area (30 mm×150 mm) of the fabric between chucks to determine the hysteresis energy per unit surface area. The hysteresis energy per surface area between chucks of the fabric in the warp direction and the weft direction was each divided by the total weight of the fabric to determine the energy allowance (EW) in the warp direction and the energy allowance (EF) in the weft direction.

Energy absorption amount at a given point in time={(n+1-th elongation)−(n-th elongation)}×(n+1-th stress)   Formula (3):

The n-th elongation is the value of elongation in the longitudinal direction or the lateral direction at a given point in time in the series of processes from the addition of stress in the longitudinal direction or the lateral direction to relaxation. The n+1-th elongation (stress) is the value of elongation (stress) in the longitudinal direction or the lateral direction after 50 msec from the value of the n-th elongation (stress). From formula (3), the energy allowance at a given point in time in the series of processes from the addition of stress in the longitudinal direction or lateral direction to relaxation can be calculated. Thus, the hysteresis energy per unit surface area is calculated by adding up the energy allowance at each point obtained from the start to the end and dividing the sum by the surface area between chucks (30 mm×150 mm). Additionally, the energy allowance (EW) in the warp direction and the energy allowance (EF) in the weft direction can be calculated by dividing the hysteresis energy per surface area between chucks of the fabric in the warp direction and the weft direction by the total weight.

Restraint Capacity Use Rate

Regarding the restraint capacity use rate, yarn was removed from both sides of the width in both the longitudinal direction and the lateral direction in accordance with JIS K 6404-3:1999 6. test method B (strip method), and three test specimens (width 30 mm, length 300 mm) were taken and stretched with a tester (a model for constant rate of traverse) with the distance between the grips being 150 mm at a tension rate of 200 ram/min until the stress reached 120 N/cm. The restraint capacity use rate (RW) in the warp direction and the restraint capacity use rate (RF) in the weft direction were calculated based on the obtained data on elongation, the elongation at breaking force of the fabric determined above, and the following formula (4).

Elongation at 120 N/cm/Elongation at Breaking Force   Formula (4):

Initial Scrub Test Strokes of Fabric

Calculation was performed in accordance with ISO 5981. Specifically, five test specimens were taken from a sample. Each test specimen was fixed onto a scrub tester and tested under an initial load of 1 kgf, followed by visually studying the degree of peeling of the coating on the sample after the test. The number of times immediately before the coating of the sample peeled off to expose the fabric surface (i.e., the limit of the number of times the coating of the sample does not peel off) was determined in unit of 50 times. The average was calculated and determined to be the scrub test strokes.

Scrub Test Strokes of Fabric after Aging Treatment at 70° C. at 95% RH for 408 Hours Aging treatment was performed on a sample at 70° C. at 95% RH for 408 hours with a low-temperature and constant-climatic-chamber platinous J-Series PL-2J (ESPEC Corp.), and calculation was performed with the sample after aging treatment in accordance with ISO 5981. Specifically, five test specimens were taken from a sample. Each test specimen was fixed onto a scrub tester and tested under an initial load of 1 kgf, followed by studying the degree of peeling of the coating on the sample after the test. The number of times immediately before the coating of the sample peeled off to expose the fabric surface (i.e., the limit of the number of times the coating of the sample does not peel off) was determined in unit of 50 times. The average was calculated and determined to be the scrub test strokes.

Dimensional Change by Dry-Heat of Fabric

Measurement was performed in accordance with JIS L1096 (2010) 8.38.3. Specifically, two test specimens (about 250 mm×250 mm) were taken from a sample, and three points were marked at equal intervals in both the vertical and horizontal directions at a length of 20 cm from the point of 2.5 cm from the cut edge, and the length between the marks was recorded as the length before treatment. The samples, the lengths of which were recorded, were dried in a thermostatic dryer at 150° C. for 30 minutes. After the treated samples were taken out, the length between the marks was recorded as the length after treatment in the same manner as the length before treatment, and the dimensional change by dry-heat was calculated based on the following formula (5).

Dimensional Change by Dry-heat (%)=(b−a)/a×100   Formula (5):

a: length (cm) before treatment, b: length (cm) after treatment

Bow Rate of Fabric

Measurement was performed in accordance with JIS L1096 (2010) 8.12.A. Specifically, a test specimen with a length of 10 cm in full width was taken from a sample, and a horizontal yarn line AB was drawn from one selvage A to the other selvage B along its horizontal yarn as shown in FIG. 1. Second, a line orthogonal to the selvage was drawn from A, and a point at which the drawn line intersects with the other selvage was determined to be C, followed by determining the length a (cm) of line AC (width). The maximum oblique distance (cm) between AC shown in FIG. 1 was measured, and the bow rate was calculated according to the following formula (6).

Bow Rate of Woven Fabric (%)=b/a×100   Formula (6):

a: width (cm), b: maximum oblique distance (cm)

VOC Content in Fabric

Measurement was performed in accordance with VDA278. Specifically, a sample of 30 mg±5 mg was precisely weighed, and the components generated during heating of the sample at 90° C. for 30 minute were measured by thermal desorption-GCMS, followed by quantification in toluene equivalents. The same measurement was performed twice, and the higher value was determined to be the VOC content.

Crimp Ratio of Fabric

Measurement was performed in accordance with JIS L1096 (2010) 8.7.2: method B. The load applied was 1/10 g per dtex.

Amount of Coating Agent Applied to Fabric

After the resin was cured, a sample of a coated fabric was taken in precise 5-cm squares and immersed in a solvent that dissolves only the fibers, which are the base fabric (hexafluoroisopropanol for polyester fibers), to dissolve the fabric. Subsequently, only the insoluble matter (a silicone coating layer) was collected, and acetone washing was performed. After vacuum drying, the sample was weighed. The coating amount is expressed as mass per square meter (g/m$^2$).

Total Fineness of Original Yarn

Measurement was performed in accordance with JIS L1013 (2010) 8.3.1. Specifically, an initial load was applied, and a sample with a length of 90 cm was precisely weighed. The absolute dry mass was measured, and the corrected fineness (dtex) was calculated based on the following formula (7). The average of five measurements was determined to be the total fineness.

$$F0 = 1000 \times m/0.9 \times + (100 + R0)/100 \quad \text{Formula (7):}$$

F0: corrected fineness (dtex), L: length (m) of sample, m: absolute dry mass (g) of sample, R0: official regain (%)

Example 1

A polyester-multifilament original yarn with a fineness of 555 dtex/96f (the cross-sectional surface of the single filament had a circular shape) was used in the warp yarn and the weft yarn. Weaving was performed in a plain weave pattern at a predetermined weaving density of 51 threads/2.54 cm in both the warp and weft with a water-jet loom under the weaving conditions shown in Table 1. Thereafter, the fabric was passed through a hot-water shrinkage tank at 98° C. without drying and then continuously passed through a drying process so that the fabric surface temperature at the outlet of the dryer reached 120° C. (measured with a non-contact thermometer).

Subsequently, a solvent-free silicone resin composition with a resin viscosity of 18 Pa·sec was applied to one surface of the woven fabric by knife-on-air under the conditions shown in Table 1 such that the coating amount was 26 g/m². Curing treatment was further performed such that the fabric surface temperature at the outlet of the heat treatment device (measured with a non-contact thermometer) was 170° C., thereby obtaining a coated fabric. Table 1 shows the details of production conditions, and Table 2 shows the physical properties of the obtained coated fabric.

Example 2

A polyester-multifilament original yarn with a fineness of 470 dtex/144f (the cross-sectional surface of the single filament had a circular shape) was used in the warp yarn and the weft yarn. Weaving was performed in a plain weave pattern at a predetermined weaving density of 51 threads/2.54 cm in both the warp and weft with a water-jet loom under the weaving conditions shown in Table 1. Thereafter, the fabric was passed through a hot-water shrinkage tank at 98° C. without drying and then continuously passed through a drying process so that the fabric surface temperature at the outlet of the dryer reached 120° C. (measured with a non-contact thermometer).

Subsequently, a solvent-free silicone resin composition with a resin viscosity of 18 Pa·sec was applied to one surface of the woven fabric by knife-on-air under the conditions shown in Table 1 such that the coating amount was 24 g/m². Curing treatment was further performed such that the fabric surface temperature at the outlet of the heat treatment device (measured with a non-contact thermometer) was 170° C., thereby obtaining a coated fabric. Table 1 shows the details of production conditions, and Table 2 shows the physical properties of the obtained coated fabric.

Example 3

A polyester-multifilament original yarn with a fineness of 470 dtex/96f (the cross-sectional surface of the single filament had a circular shape) was used in the warp yarn and the weft yarn. Weaving was performed in a plain weave pattern at a predetermined weaving density of 46 threads/2.54 cm in both the warp and weft with a water-jet loom under the weaving conditions shown in Table 1. Thereafter, the fabric was passed through a hot-water shrinkage tank at 98° C. without drying and then continuously passed through a drying process so that the fabric surface temperature at the outlet of the dryer reached 120° C. (measured with a non-contact thermometer).

Subsequently, a solvent-free silicone resin composition with a resin viscosity of 18 Pa·sec was applied to one surface of the woven fabric by knife-on-air under the conditions shown in Table 1 such that the coating amount was 15 g/m². Curing treatment was further performed such that the fabric surface temperature at the outlet of the heat treatment device (measured with a non-contact thermometer) was 170° C., thereby obtaining a coated fabric. Table 1 shows the details of production conditions, and Table 2 shows the physical properties of the obtained coated fabric.

Example 4

A polyester-multifilament original yarn with a fineness of 470 dtex/96f (the cross-sectional surface of the single filament had a circular shape) was used in the warp yarn and the weft yarn. Weaving was performed in a plain weave pattern at a predetermined weaving density of 46 threads/2.54 cm in both the warp and weft with a water-jet loom under the weaving conditions shown in Table 1. Thereafter, the fabric was passed through a hot-water shrinkage tank at 98° C. without drying and then continuously passed through a drying process so that the fabric surface temperature at the outlet of the dryer reached 120° C. (measured with a non-contact thermometer).

Subsequently, a solvent-free silicone resin composition with a resin viscosity of 50 Pa·sec was applied to one surface of the woven fabric by knife-on-air under the conditions shown in Table 1 such that the coating amount was 15 g/m². Curing treatment was further performed such that the fabric surface temperature at the outlet of the heat treatment device (measured with a non-contact thermometer) was 170° C., thereby obtaining a coated fabric. Table 1 shows the details of production conditions, and Table 2 shows the physical properties of the obtained coated fabric.

Example 5

A polyester-multifilament original yarn with a fineness of 470 dtex/144f (the cross-sectional surface of the single filament had a circular shape) was used in the warp yarn and the weft yarn. Weaving was performed in a plain weave pattern at a predetermined weaving density of 58.5 threads/2.54 cm in both the warp and weft with a water-jet loom under the weaving conditions shown in Table 1. Thereafter, the fabric was passed through a hot-water shrinkage tank at 98° C. without drying and then continuously passed through a drying process so that the fabric surface temperature at the outlet of the dryer reached 120° C. (measured with a non-contact thermometer).

Subsequently, a solvent-free silicone resin composition with a resin viscosity of 18 Pa·sec was applied to one surface of the woven fabric by knife-on-air under the conditions shown in Table 1 such that the coating amount was 25 g/m². Curing treatment was further performed such that the fabric surface temperature at the outlet of the heat treatment device (measured with a non-contact thermometer) was 170° C., thereby obtaining a coated fabric. Table 1 shows the details of production conditions, and Table 2 shows the physical properties of the obtained coated fabric.

Example 6

A polyester-multifilament original yarn with a fineness of 555 dtex/144f (the cross-sectional surface of the single filament had a circular shape) was used in the warp yarn and the weft yarn. Weaving was performed in a plain weave pattern at a predetermined weaving density of 54.5 threads/2.54 cm in both the warp and weft with a water-jet loom under the weaving conditions shown in Table 1. Thereafter, the fabric was passed through a hot-water shrinkage tank at 98° C. without drying and then continuously passed through a drying process so that the fabric surface temperature at the outlet of the dryer reached 120° C. (measured with a non-contact thermometer).

Subsequently, a solvent-free silicone resin composition with a resin viscosity of 18 Pa·sec was applied to one surface of the woven fabric by knife-on-air under the conditions shown in Table 1 such that the coating amount was 25 g/m². Curing treatment was further performed such that the fabric surface temperature at the outlet of the heat treatment device (measured with a non-contact thermometer) was 170° C., thereby obtaining a coated fabric. Table 1 shows the details of production conditions, and Table 2 shows the physical properties of the obtained coated fabric.

Comparative Example 1

A polyester-multifilament original yarn with a fineness of 560 dtex/96f (the cross-sectional surface of the single filament had a circular shape) was used in the warp yarn and the weft yarn. Weaving was performed in a plain weave pattern at a predetermined weaving density of 46 threads/2.54 cm in both the warp and weft with a water-jet loom under the weaving conditions shown in Table 1. Thereafter, the fabric was passed through a hot-water shrinkage tank at 65° C. without drying and then continuously passed through a drying process so that the fabric surface temperature at the outlet of the dryer reached 90° C. (measured with a non-contact thermometer).

Subsequently, a solvent-free silicone resin composition with a resin viscosity of 50 Pa·sec was applied to one surface of the woven fabric by knife-on-air under the conditions shown in Table 1 such that the coating amount was 29 g/m². Curing treatment was further performed such that the fabric surface temperature at the outlet of the heat treatment device (measured with a non-contact thermometer) was 160° C., thereby obtaining a coated fabric. Table 1 shows the details of production conditions, and Table 2 shows the physical properties of the obtained coated fabric.

Comparative Example 2

A polyester-multifilament original yarn with a fineness of 560 dtex/96f (the cross-sectional surface of the single filament had a circular shape) was used in the warp yarn and the weft yarn. Weaving was performed in a plain weave pattern at a predetermined weaving density of 46 threads/2.54 cm in both the warp and weft with a water-jet loom under the weaving conditions shown in Table 1. Thereafter, the fabric was passed through a hot-water shrinkage tank at 65° C. without drying and then continuously passed through a drying process so that the fabric surface temperature at the outlet of the dryer reached 90° C. (measured with a non-contact thermometer).

Subsequently, a solvent-free silicone resin composition with a resin viscosity of 50 Pa·sec was applied to one surface of the woven fabric by knife-on-air under the conditions shown in Table 1 such that the coating amount was 18 g/m². Curing treatment was further performed such that the fabric surface temperature at the outlet of the heat treatment device (measured with a non-contact thermometer) was 160° C., thereby obtaining a coated fabric. Table 1 shows the details of production conditions, and Table 2 shows the physical properties of the obtained coated fabric.

TABLE 1

| Item | Unit | Example 1 | Example 2 | Example 3 | Example 4 | Example 5 | Example 6 | Comparative Example 1 | Comparative Example 2 |
|---|---|---|---|---|---|---|---|---|---|
| Total Fineness of Original Yarn | dtex | 555 | 470 | 470 | 470 | 470 | 555 | 560 | 560 |
| Number of Filaments of Original Yarn | Thread | 96 | 144 | 96 | 96 | 144 | 144 | 96 | 96 |
| Fineness of Single Filament of Original Yarn | dtex | 5.8 | 3.3 | 4.9 | 4.9 | 3.3 | 3.9 | 5.8 | 5.8 |
| Predetermined Warp Density at Weaving | Thread/2.54 cm | 51.0 | 51.0 | 46.0 | 46.0 | 58.5 | 54.5 | 46.0 | 46.0 |
| Weft | Thread/2.54 cm | 51.0 | 51.0 | 46.0 | 46.0 | 58.5 | 54.5 | 46.0 | 46.0 |
| Warp Yarn Tension during Weaving | cN/thread | 150 | 150 | 140 | 140 | 180 | 180 | 117 | 117 |
| Dwell Angle during Weaving | ° | 85 | 85 | 60 | 60 | 85 | 85 | 45 | 45 |
| Warp Line Height during Weaving | mm | 38 | 38 | 38 | 38 | 38 | 38 | 60 | 60 |
| Amount of Easing during Weaving | mm | 5.0 | 5.0 | 5.0 | 5.0 | 7.5 | 7.5 | 3.2 | 3.2 |
| Takeup Tension during Weaving | N | 750 | 750 | 1000 | 1000 | 500 | 500 | 2000 | 2000 |
| Hot-water Treatment Tank Temperature | ° C. | 98 | 98 | 98 | 98 | 98 | 98 | 65 | 65 |
| Hot-air Dryer Temperature | ° C. | 150 | 150 | 150 | 150 | 150 | 150 | 120 | 120 |
| Fabric Surface Temperature during Drying | ° C. | 120 | 120 | 120 | 120 | 120 | 120 | 90 | 90 |
| Resin Viscosity | Pa · sec | 18 | 18 | 18 | 50 | 18 | 18 | 50 | 50 |
| Knife Push-in Depth | mm | 1.5 | 2.0 | 1.5 | 2.0 | 2.0 | 2.0 | 1.0 | 2.0 |
| Coating Amount | g/m² | 26 | 24 | 15 | 15 | 25 | 25 | 29 | 18 |

TABLE 1-continued

| Item | Unit | Example 1 | Example 2 | Example 3 | Example 4 | Example 5 | Example 6 | Comparative Example 1 | Comparative Example 2 |
|---|---|---|---|---|---|---|---|---|---|
| Tension during Coating | N/m | 1700 | 1400 | 1800 | 1800 | 1000 | 1000 | 2500 | 2500 |
| Heat Treatment Temperature | °C. | 200 | 200 | 200 | 200 | 200 | 200 | 190 | 190 |
| Fabric Surface Temperature during Curing | °C. | 170 | 170 | 170 | 170 | 170 | 170 | 160 | 160 |

TABLE 2

| Item | | Unit | Example 1 | Example 2 | Example 3 | Example 4 | Example 5 | Example 6 | Comparative Example 1 | Comparative Example 2 |
|---|---|---|---|---|---|---|---|---|---|---|
| Fabric Weight per Unit Area | | g/m² | 268 | 217 | 201 | 201 | 265 | 290 | 247 | 233 |
| Weaving Density | Warp | Thread/2.54 cm | 52.3 | 52.1 | 46.0 | 46.0 | 59.0 | 55.0 | 46.2 | 45.9 |
| | Weft | Thread/2.54 cm | 51.8 | 51.6 | 46.0 | 46.0 | 59.0 | 55.0 | 46.9 | 46.1 |
| Thickness | | mm | 0.31 | 0.27 | 0.25 | 0.25 | 0.33 | 0.33 | 0.30 | 0.28 |
| Cover Factor | | — | 2452 | 2247 | 1995 | 1995 | 2558 | 2591 | 2203 | 2177 |
| Tensile Strength | Warp | N | 3967 | 3125 | 2984 | 2924 | 4231 | 4392 | 4790 | 4921 |
| | Weft | N | 3878 | 3063 | 2899 | 2866 | 4398 | 4400 | 4551 | 4433 |
| Hysteresis Energy per Unit Surface Area | Warp (EW) | mJ/cm² | 33 | 31 | 29 | 30 | 36 | 33 | 111 | 107 |
| | Weft (EF) | mJ/cm² | 18 | 42 | 18 | 17 | 24 | 27 | 78 | 87 |
| Energy Allowance per Unit Weight (EA) | | J/g | 1.9 | 3.4 | 2.3 | 2.3 | 2.3 | 2.1 | 7.6 | 8.2 |
| Fabric Elongation under Load of 120 N/cm | Warp (RW) | mm | 17 | 13 | 15 | 15 | 20 | 22 | 11 | 11 |
| | Weft (RF) | mm | 11 | 18 | 11 | 10 | 15 | 19 | 12 | 13 |
| Elongation at Breaking Force | Warp (BW) | mm | 29 | 29 | 26 | 25 | 33 | 32 | 27 | 28 |
| | Weft (BF) | mm | 24 | 28 | 25 | 25 | 33 | 30 | 30 | 30 |
| Restraint Capacity Use Rate (RR) | | % | 106 | 108 | 102 | 101 | 106 | 132 | 82 | 82 |
| Initial Scrub Test Strokes | Warp | Count | 1400 | 570 | 480 | 470 | 1600 | 1740 | 320 | 330 |
| | Weft | Count | 1400 | 570 | 480 | 470 | 1600 | 1740 | 320 | 330 |
| Scrub Test Strokes after Hydrothermal Aging | Warp | Count | 650 | 410 | 420 | 410 | 700 | 720 | 160 | 120 |
| | Weft | Count | 650 | 410 | 420 | 410 | 700 | 720 | 160 | 120 |
| Dimensional Change by Dry-heat | Warp | % | 0.0 | −0.4 | 0.2 | 0.1 | −0.2 | 0.2 | 0.2 | 0.6 |
| | Weft | % | −0.4 | −0.4 | 0.1 | 0.1 | 0.3 | −0.2 | 0.4 | 0.4 |
| Bow Rate of Fabric | | % | 1.0 | 0.7 | 0.8 | 0.9 | 1.0 | 0.9 | 2.2 | 2.3 |
| VOC Content | | ppm | 56 | 44 | 53 | 55 | 33 | 42 | 92 | 102 |
| Crimp Ratio | Warp | % | 5.1 | 2.7 | 3.1 | 3.0 | 4.4 | 6.2 | 0.8 | 1.3 |
| | Weft | % | 3.8 | 4.1 | 4.8 | 4.7 | 5.9 | 3.8 | 1.2 | 0.5 |

INDUSTRIAL APPLICABILITY

The present invention relates to a polyester fabric for airbags that maintains the mechanical characteristic as an airbag, that has high restraint performance to catch the occupant during deployment, and that maintains a high level of the performance even after the fabric undergoes changes over time. The invention will expand the use of relatively low-priced polyester airbags and thus greatly contribute to the development of the industry.

DESCRIPTION OF THE REFERENCE NUMERALS

A: point on one selvage
B: point on the other selvage
C: point at which a line drawn from A to be orthogonal to one selvage intersects with the other selvage
a: length of line AC (width)
b: maximum oblique distance between AC

The invention claimed is:

1. A polyester fabric for airbags, the polyester fabric having a coating resin on at least one surface, wherein the polyester fabric for airbags has scrub test strokes of 400 or more after aging treatment at 70° C. at 95% RH for 408 hours, wherein warp yarn and weft yarn that constitute the fabric each have a crimp ratio of 1.0% to 12.0%.

2. The polyester fabric for airbags according to claim 1, wherein an energy allowance (EA) per unit weight as calculated according to the following formula 1 is 5.0 (J/g) or less, $$EA(J/g) = (EW + EF)/W \quad \text{Formula 1}$$

wherein EW (mJ/cm2) represents a hysteresis energy per unit surface area in the warp direction when the fabric is stretched to a stress of 120 N/cm and then relaxed to a stress of 0 N/cm, EF (mJ/cm2) represents a hysteresis energy per unit surface area in the weft direction when the fabric is stretched to a stress of 120 N/cm and then relaxed to a stress of 0 N/cm, and W (g/m2) represents a weight per unit area of the fabric.

3. The polyester fabric for airbags according to claim 1, wherein a restraint capacity use rate (RR) calculated according to the following formula 2 is 85% or more, $$RR(\%) = RW/BW + RF/BF \qquad \text{Formula 2}$$

wherein RW (mm) represents an elongation of the fabric in the warp direction under a load of 120 N/cm, BW (mm) represents an elongation at breaking force of the fabric in the warp direction, RF (mm) represents an elongation of the fabric in the weft direction under a load of 120 N/cm, and BF (mm) represents an elongation at breaking force of the fabric in the weft direction.

4. The polyester fabric for airbags according to claim 1, wherein the polyester fabric for airbags has an initial scrub test strokes of 500 or more.

5. The polyester fabric for airbags according to claim 1, wherein the polyester fabric for airbags has a cover factor of 1900 to 2600.

6. The polyester fabric for airbags according to claim 1, wherein the polyester fabric for airbags has a total weight of 300 g/m2 or less.

7. The polyester fabric for airbags according to claim 1, wherein the coating resin is a silicone resin, and the resin is coated in an amount of 5 g/m2 or more and 50 g/m2 or less.

8. The polyester fabric for airbags according to claim 1, comprising a polyester fiber with a total fineness of 200 to 555 dtex, and a single-filament fineness of 6.0 dtex or less.

9. The polyester fabric for airbags according to claim 1, wherein the polyester fabric for airbags has a dimensional change by dry-heat of 3% or less.

10. The polyester fabric for airbags according to claim 1, wherein the polyester fabric for airbags has a bow rate of 3% or less.

11. The polyester fabric for airbags according to claim 1, wherein the polyester fabric for airbags has a VOC component content of 100 ppm or less.

* * * * *